(12) United States Patent
Zoppelt et al.

(10) Patent No.: US 10,459,439 B2
(45) Date of Patent: Oct. 29, 2019

(54) METHOD FOR PROVIDING AT LEAST ONE SPECIFIC VEHICLE STATE OF A VEHICLE

(71) Applicant: Dr. Ing. h.c. F. Porsche Aktiengesellschaft, Stuttgart (DE)

(72) Inventors: Gerald Zoppelt, Weissach-Flacht (DE); Sven Conradi, Ammerbuch-Altingen (DE); Ruediger Roppel, Flieden (DE); Markus Koch, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 1 day.

(21) Appl. No.: 15/658,408

(22) Filed: Jul. 25, 2017

(65) Prior Publication Data

US 2018/0032070 A1    Feb. 1, 2018

(30) Foreign Application Priority Data

Jul. 27, 2016  (DE) .................. 10 2016 113 795

(51) Int. Cl.
| | | |
|---|---|---|
| *G05D 1/00* | (2006.01) | |
| *G07C 5/00* | (2006.01) | |
| *G07C 5/08* | (2006.01) | |

(52) U.S. Cl.
CPC ......... *G05D 1/0022* (2013.01); *G05D 1/0055* (2013.01); *G07C 5/00* (2013.01); *G07C 5/08* (2013.01)

(58) Field of Classification Search
CPC ........ G06F 11/2294; G06F 8/61; G06F 8/654; G06F 9/4406; G07C 5/008; G07C 5/0808; G07C 5/00; H04L 67/34; G05D 1/0022; G05D 1/0055

See application file for complete search history.

(56) References Cited

U.S. PATENT DOCUMENTS

| | | | |
|---|---|---|---|
| 2007/0004553 A1* | 1/2007 | Oikawa ................ | B60W 30/20 477/97 |
| 2011/0144839 A1* | 6/2011 | Pudar .................... | B60W 40/09 701/22 |
| 2013/0061044 A1 | 3/2013 | Pinkus et al. | |
| 2014/0005880 A1 | 1/2014 | Guenkova-Luy et al. | |
| 2014/0100737 A1* | 4/2014 | Haap ................... | G06F 11/2294 701/31.4 |
| 2014/0135598 A1* | 5/2014 | Weidl .................. | A61B 5/0205 600/301 |
| 2016/0147563 A1 | 5/2016 | Prakah-Asante et al. | |
| 2016/0328890 A1* | 11/2016 | Keane .................... | G07C 5/008 |
| 2017/0050590 A1* | 2/2017 | List ........................ | B60W 40/12 |

FOREIGN PATENT DOCUMENTS

| | | |
|---|---|---|
| DE | 102014006319 A1 | 11/2015 |
| DE | 102015012233 A1 | 4/2016 |
| DE | 102015119717 A1 | 5/2016 |

* cited by examiner

*Primary Examiner* — Rachid Bendidi
(74) *Attorney, Agent, or Firm* — Leydig, Voit & Mayer, Ltd.

(57) ABSTRACT

A method for providing at least one specific vehicle state of a vehicle. The method includes acquiring basic parameters of the vehicle from at least one data source; comparing the acquired basic parameters with a comparison list; and providing a specific vehicle state for the acquired basic parameters based on the comparison.

8 Claims, 3 Drawing Sheets

METHOD FOR PROVIDING AT LEAST ONE SPECIFIC VEHICLE STATE OF A VEHICLE

CROSS REFERENCE TO RELATED APPLICATIONS

This application claims benefit to German Patent Application No. DE 10 2016 113 795.2, filed Jul. 27, 2016, which is hereby incorporated by reference herein.

FIELD

The present invention relates to a method for providing at least one specific vehicle state and to a control apparatus for a vehicle.

BACKGROUND

It is known that a multiplicity of data is generated in a vehicle and is used to control the vehicle. Usually, one or more control devices are used in the vehicles for this purpose, said control devices receiving data from a wide variety of sensors and further processing said data in order to control individual functions. Said functions are usually the primary vehicle functions, for example handling crash situations, ensuring regular driving operation or providing comfort functions for the driver of the vehicle.

SUMMARY

In an embodiment, the present invention provides a method for providing at least one specific vehicle state of a vehicle. The method includes acquiring basic parameters of the vehicle from at least one data source; comparing the acquired basic parameters with a comparison list; and providing a specific vehicle state for the acquired basic parameters based on the comparison.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
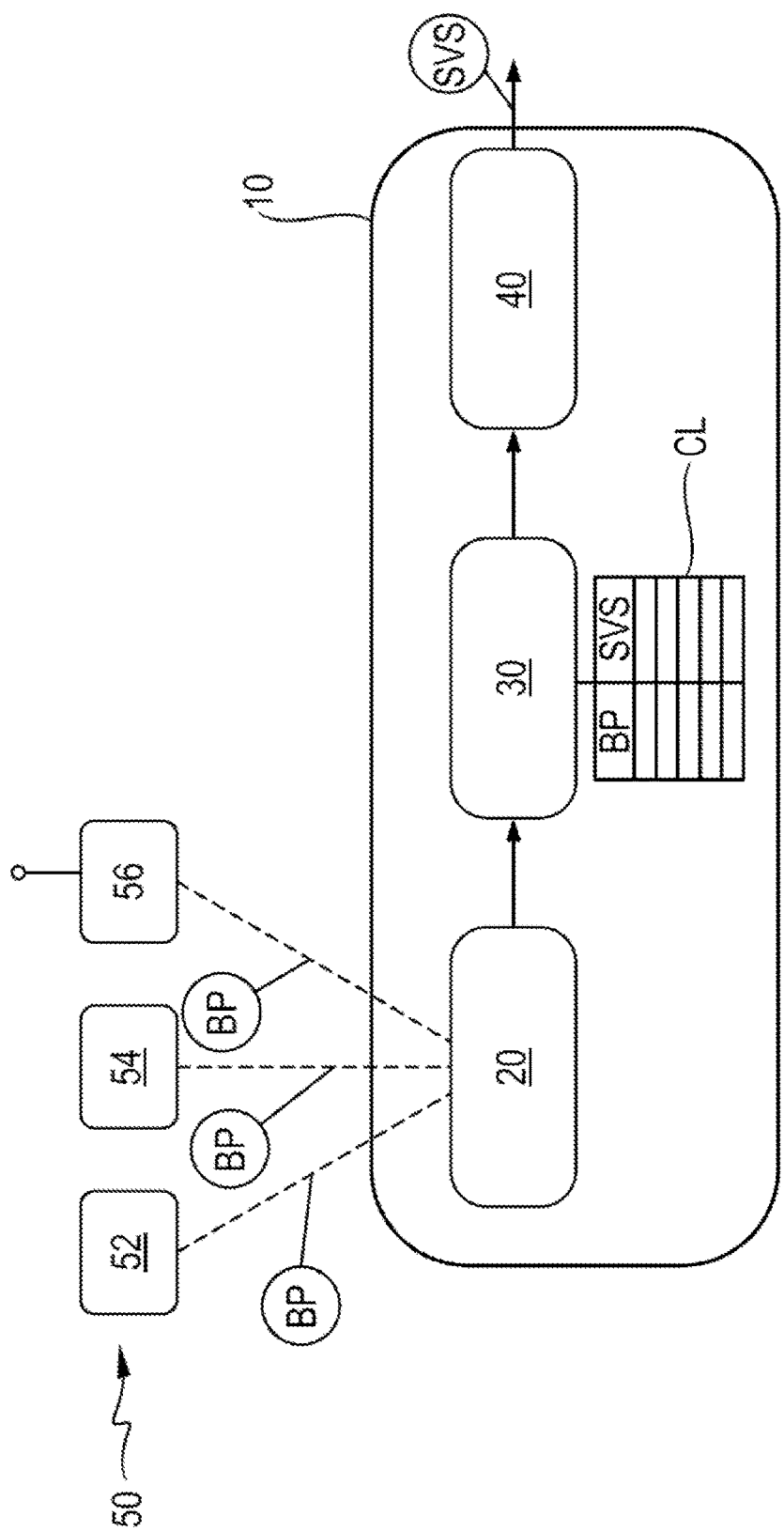
FIG. 1 depicts an embodiment according to a method of the invention.

A disadvantage of the known solutions is that they completely disregard secondary vehicle functions, in particular diagnosis functions, configuration functions or other similar functions. This leads to a situation in which, in order to intervene in the logics of the control devices, manual adjustment in a workshop and an appropriate diagnostic tool, usually in the form of a laptop, are necessary. A development in the form of an adaptive system is also not possible, or only possible to a very limited extent, based on the known control functionalities of primary vehicle functions.

Embodiments of the present invention at least partially eliminate the disadvantages described above. In particular, embodiments of the present invention provide, cost-effectively and simply, a method that can provide vehicle states, in particular in correlation with vehicle functions.

A method is described herein for providing at least one specific vehicle state of a vehicle. For this purpose, the method has the following steps: acquiring basic parameters of the vehicle from at least one data source, comparing the acquired basic parameters with a comparison list, providing a specific vehicle state for the acquired basic parameters based on the comparison.

Embodiments of the invention provide for acquiring basic parameters from at least one data source. Basic parameters should be understood to mean, in particular, data that can be supplied by control devices, sensors, communication buses or else by means of appropriate interfaces from outside of the vehicle. Data of this kind can be, for example, diagnosis data, measurement values, coding values, identification values or the like. In accordance with the invention, a comparison with a comparison list then takes place based on the acquired basic parameters. Said comparison list contains a correlation between the acquired basic parameters or all possible acquirable basic parameters on the one side and associated specific vehicle states on the other side.

A specific vehicle state can be related, for example, to the location of the vehicle, the operating situation thereof or the like. It is thus possible for secure vehicle states, inactive vehicle states, switched-off vehicle states, parked vehicle states and many other states as well to be identifiable as specific vehicle states. An example of a specific vehicle state is a situation in which a vehicle arrives at the area "Home" by means of a GPS signal. A further basic parameter in this context may be the correlation with the ignition key. As soon as the ignition is switched off, this can enter the comparison list as a further basic parameter for the comparison step. Therefore, as soon as the vehicle is located in the position "Home" in a parked state using the GPS position and at the same time the ignition key has been removed or the ignition has been switched off, a correspondingly secure and parked vehicle state can be identified from the comparison list and be provided in this way.

As can be identified from the above example, it is then possible to further utilize basic parameters of the vehicle that are already present or additionally generated. In particular, it is possible, in any desired manner, to carry out programming that allows a wide variety of vehicle states to be defined in advance as specific vehicle states using the method according to the invention. In this case, it is conceivable for each specific vehicle state to depend on one, two or any number of basic parameters. As will also be explained subsequently, a multiplicity of further actions can then be executed based on a provided specific vehicle state. A particularly advantageous method is, in this case, the execution of correlated vehicle functions. That means, therefore, that individual vehicle functions in particular can be executed or are only executed when an associated specific vehicle state that correlates to said vehicle function has been provided by a method according to the invention. For example, a control device can only be reset in a secure manner when the vehicle is not being operated. Since a vehicle is usually parked outside of the position "Home" for parking times of different lengths, a resetting of the control device is unwanted because a short parking time is also possible and hence it would not be possible to restart the vehicle when the control device is resetting. A correspondingly secure vehicle state for the resetting of a control device would be, accordingly, not only a parked vehicle but also a correlation of the parked vehicle with the geoposition "Home". A specific vehicle state of this kind that correlates to the possibility of resetting the control device may therefore trigger or activate said execution of the corresponding vehicle function.

In other words, a method according to an embodiment of the invention allows secure execution of a wide variety of vehicle functions. These may be active vehicle functions or else diagnosis functions. It is also possible to program, configure, reset or else update individual elements of a vehicle or individual components of control devices depending on the provided specific vehicle state. This increases operational safety and, moreover, comfort when carrying out a method according to the invention for the operation of a corresponding vehicle. In addition to the increased safety, increased comfort of the driver can also be provided since an adaptive system can also be provided by the corresponding operating states. It is therefore conceivable for the setup or the modification of the comparison list to be provided in a corresponding control apparatus by the acquired basic parameters. Corresponding vehicle states can therefore be modifiable in their dependency on the basic parameters variably by means of the use duration depending on the benefit to the customer. It is also conceivable for new specific vehicle states to be incorporated into the corresponding comparison list when the need therefor has been identified by a corresponding control apparatus based on the acquired basic parameter. An example of this is what is known as a start-stop function. If a user will often switch off the start-stop function in specific vehicle situations, i.e. depending on specific acquirable basic parameters, a specific vehicle state can be defined by this information using said correlated basic parameters. As soon as this correlation of the acquirable basic parameters occurs in the future, then the vehicle state "Customer request: start-stop off" can be provided. It is then possible to actively switch off the vehicle function of the start-stop function of the vehicle automatically based on this provided vehicle state.

In a method according to an embodiment of the invention, it can be advantageous when the basic parameters are acquired at least from a control device of the vehicle as data source. A control device should be understood to mean a device that serves for control, open-loop control and/or closed-loop control of individual operating elements of the vehicle. A processor unit is usually arranged in a control device of this kind and is designed to acquire, process and transfer data. Said control device accordingly receives sensor data that is provided by a wide variety of sensors in a wide variety of positions of the vehicle. Said sensor data or the transfer, processing or further manipulation thereof can be provided as basic parameters to a method according to the invention. A control device of this kind is therefore an option of a data source within the meaning of the invention. A control device of this kind may be both the central control device of the vehicle and a decentralized control device.

In a method according to an embodiment of the invention, it is likewise advantageous when the basic parameters are acquired at least from a communication bus between control devices of the vehicle as data source. Vehicles are usually equipped with two or more control devices. In this case, a central control device that communicates with decentralized control devices is often provided. A communication bus is designed for this communication, in order to ensure said data transmission. As a starting point of said communication bus, basic parameters can then likewise be used as data source for a method according to the invention. Here, it is both an alternative and an additional data source, as has been explained in the preceding paragraph.

In a method according to an embodiment of the invention, it is furthermore advantageous when the basic parameters are acquired from a telecommunication interface as data source. A telecommunication interface is, in particular, a radio interface of a vehicle according to the invention, said interface being able to send and receive data by means of a mobile radio network or a wireless LAN connection. In this way, it becomes possible to introduce even data that is present outside of the vehicle into a method according to the invention as basic parameters. Basic parameters of this kind may also be referred to as online parameters. In this way, therefore, fleet information from two or more vehicles, for example, can be assigned to a method according to the invention in a vehicle. Further online data, such as for example weather data, traffic data or the like may also be used in this way in the method according to the invention.

In a method according to an embodiment of the invention, it is furthermore advantageous when a vehicle function is executed depending on the provided specific vehicle state. As has already been explained at the outset, a specific vehicle state can be used for a multiplicity of different control mechanisms in a vehicle. A decisive advantage is achieved when said specific and provided vehicle state leads to the execution of at least one vehicle function. In other words, therefore, the vehicle function is only carried out when the specific vehicle state has also been provided. A vehicle function can therefore be triggered by providing a specific vehicle state. Alternatively or in addition, it is also conceivable for the provided specific vehicle state to represent an additional condition for executing a vehicle function that has already been assigned to execution. That therefore means that a vehicle function is queuing for execution or is activated, for example, by a central control device. The execution of said vehicle function is, however, only started or first started when an associated and correlated provided specific vehicle state is provided by the method according to the invention. The security of an execution of a vehicle function of this kind by said additional condition is accordingly significantly increased.

In a method according to an embodiment of the invention, it can be a further advantage when the provided specific vehicle state is compared with a function queue, wherein that vehicle function from the function queue that correlates to the provided specific vehicle state is executed. In other words, one or more vehicle functions can be selected or activated for implementation by a central control device, for example. As has been explained in the previous paragraph, due to the fact that such vehicle functions can require an additional condition in the form of a specific vehicle state, said vehicle function can only be executed depending on this specific vehicle state being provided. Said vehicle states are therefore stored for execution in a corresponding function queue. As soon as a specific vehicle state has then been provided by a method according to the invention that preferably runs continuously and therefore repeatedly, said vehicle state can be compared with a corresponding function queue. If there is at least one corresponding vehicle function in the function queue that correlates to the provided specific vehicle state, the additional condition is therefore fulfilled and the corresponding vehicle function is cleared for execution or is actively executed.

In a method according to an embodiment of the invention as per the preceding paragraph, when at least two vehicle functions from the function queue correlate to the same provided specific vehicle state, it can be advantageous when a priority of said at least two vehicle functions is taken into account. In principle, it is conceivable for two or more vehicle functions to be executed in parallel. However, it may also be that this is undesired at this moment, such that only a sequential execution of corresponding vehicle functions is desired. However, as soon as a vehicle state correlates to at least two vehicle functions by way of the function queue, prioritization in the form of a priority value can ensure a sequential execution, such that a corresponding conflict situation between said two competing vehicle functions from the function queue is eliminated.

In a method according to an embodiment of the invention, it is a further advantage when the acquired basic parameters are processed for the comparison. Such processing may take place by mathematical operations, for example. For example, in the case of basic parameters in the form of numerical values, it is possible to form an integration, a summation, a mean value, a variance or a similar mathematical value in order to ensure a corresponding possibility of comparison with the comparison list for the specific operating state.

According to an embodiment of the invention, a control apparatus for a vehicle is provided, the control apparatus having an acquisition module for acquiring basic parameters of the vehicle from at least one data source, a comparison module for comparing the acquired basic parameters with a comparison list and a provision module for providing a specific vehicle state for the acquired basic parameters based on the comparison. A control apparatus according to the invention is, in particular with regard to the acquisition module, the comparison module and the provision module, designed to execute a method according to the invention. A control apparatus according to the invention therefore involves the same advantages as have been explained in detail in relation to a method according to the invention.

FIG. 1 schematically shows an embodiment of a control apparatus 10 according to the invention, in which a basic version of a method according to the invention is running. The control apparatus 10 is equipped with an acquisition module 20 for this purpose. The acquisition module 20 is in data communication with at least one of the represented data sources 50, of which in this case there are three. The acquisition module 20 can thus now acquire basic parameters BP from a control device 52, a communication bus 54 and/or a telecommunication interface 56. Said basic parameters BP that have been acquired by the acquisition module 20 can then be forwarded to a comparison module 30. The comparison module 30 is equipped with a comparison list CL. In said comparison list CL, there is a correlation between acquirable basic parameters BP and specific vehicle states SVS. Here, even a single basic parameter BP can correlate to a specific vehicle state SVS. However, two or more basic parameters BP are usually required to function specifically for a specific vehicle state SVS in the comparison list CL. As soon as a correlation has been generated between the acquired basic parameters BP and a specific vehicle state SVS in the comparison list CL, a specific vehicle state SVS can be provided by the provision module 40 due to said comparison. Further processing at other locations within the vehicle is then possible.

Figure 2:
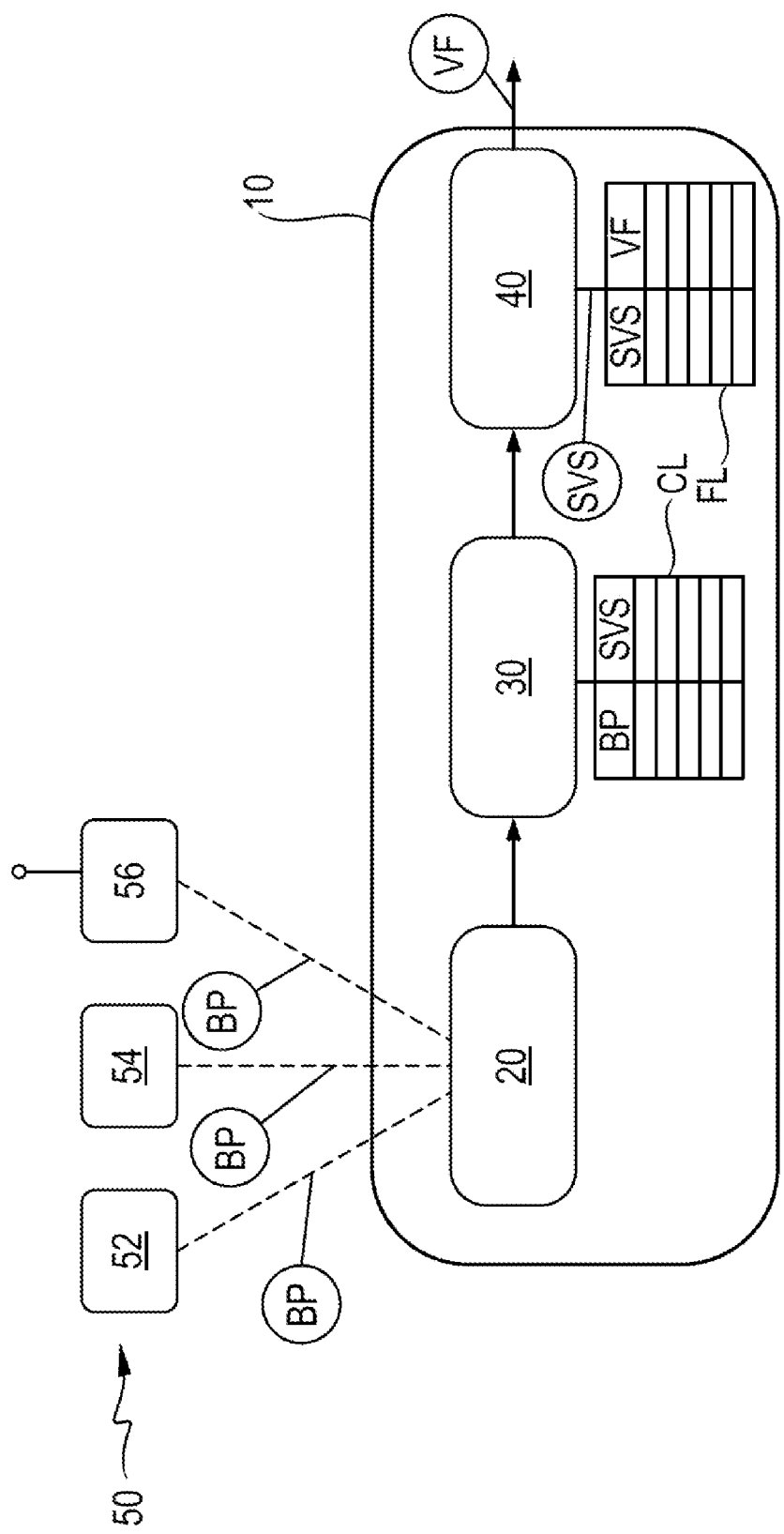
FIG. 2 depicts a further embodiment of a method according to the invention.

FIG. 2 shows how further processing can take place even within the control apparatus 10. It is therefore possible, then, in the comparison module 40 or subsequent to the comparison module 40, to compare the provided specific vehicle function SVF with a function list FL. In said function list FL, specific vehicle states are coupled with vehicle functions. A vehicle function VF can therefore be cleared by this correlation when a corresponding correlation with a specific vehicle state that has been provided previously has been identified.

Figure 3:
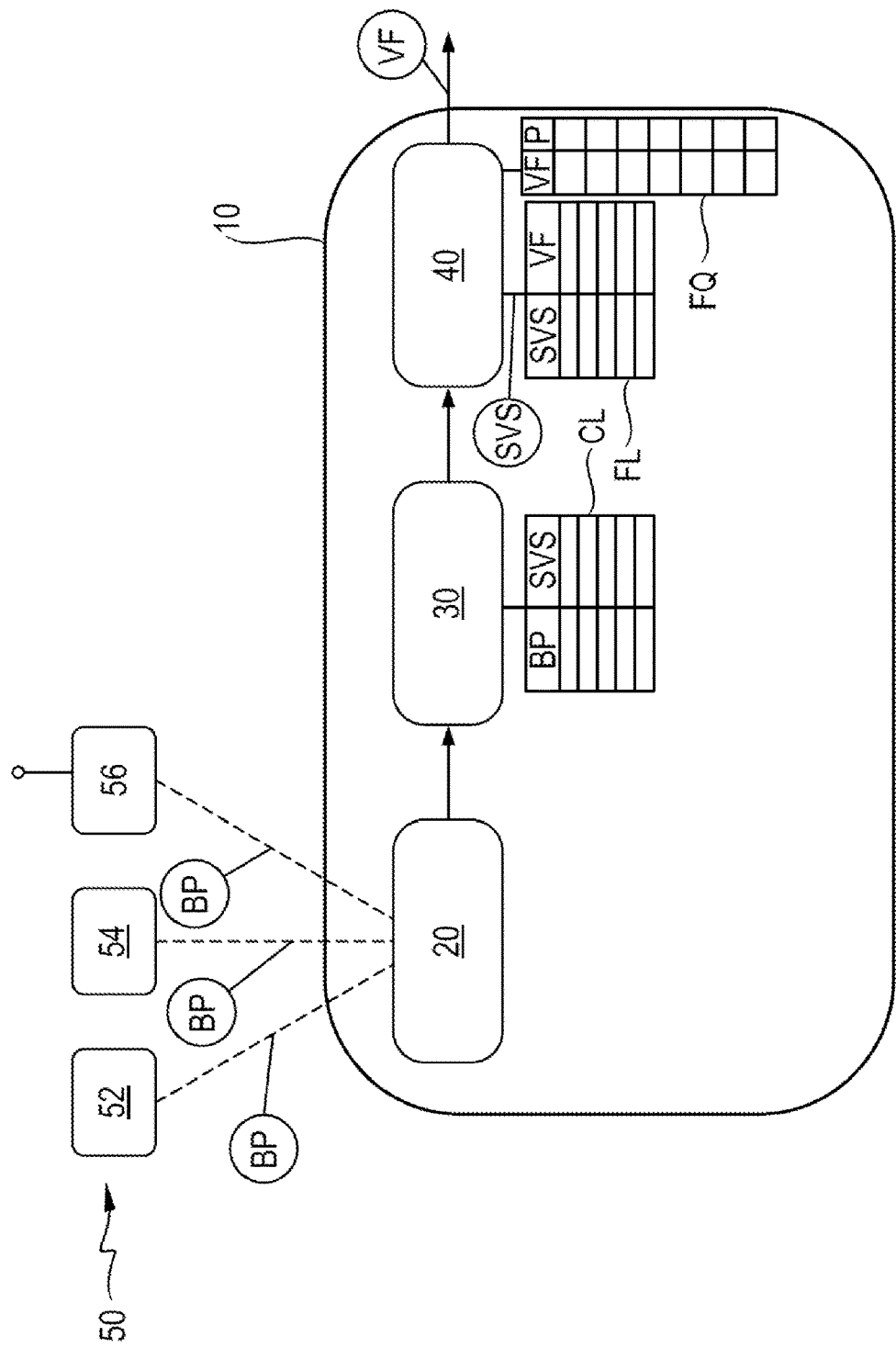
FIG. 3 depicts a further embodiment of a method according to the invention.

In addition to an active triggering, as has been explained in connection with FIG. 2, vehicle functions VF can also be activated from other locations, for example from a central control device, as per FIG. 3. Since said vehicle functions are usually equipped with an additional condition, a corresponding function queue FQ is set up in the control apparatus 10. As can be seen in FIG. 3, the individual vehicle functions VF in the function queue FQ can be assigned corresponding priorities P in order to avoid a conflict for the execution of individual vehicle functions in the case of a sequential modality.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for executing a vehicle function based on at least one vehicle state of a vehicle, the method comprising:
   acquiring, by a processor from at least one data source, a combination of basic parameter values, the combination of basic parameter values being values of a plurality of basic parameters of the vehicle;
   determining, by the processor, a specific vehicle state corresponding to the acquired combination of basic parameter values by comparing the combination of acquired basic parameter values with a comparison list in which predefined combinations of basic parameter values are coupled with predefined vehicle states;
   determining, by the processor, at least one vehicle function in a function queue that corresponds to the specific vehicle state by comparing the specific vehicle state to one or more vehicle functions in the function queue; and
   clearing the at least one determined vehicle function in the function queue for execution,
   wherein the at least one vehicle function in the function queue that corresponds to the specific vehicle state includes two or more functions that correspond to the specific vehicle state, and clearing the at least one determined vehicle function in the function queue for execution includes clearing the two or more functions that correspond to the specific vehicle state according to a priority of the two or more functions,
wherein the priority of the two or more functions is established by assigning a priority value to each of the two or more functions,
wherein the acquired combination of basic parameter values includes a GPS signal value indicating that the vehicle is in a home location and an ignition status of off, and
wherein the specific vehicle state is a secure and parked vehicle state.

2. The method as claimed in claim 1, wherein the at least one data source includes a control device of the vehicle.

3. The method as claimed in claim 1, wherein the at least one data source includes a communication bus between control devices of the vehicle.

4. The method as claimed in claim 1, wherein the at least one data source includes a telecommunication interface of the vehicle.

5. The method as claimed in claim 1, wherein the comparing the combination of acquired basic parameter values with the comparison list includes processing the acquired basic parameters.

6. The method as claimed in claim 1, wherein each of the predefined vehicle states in the comparison list is coupled with a respective predefined combination of the basic parameter values, the respective predefined combination of the basic parameter values including values for at least two of the basic parameters.

7. The method as claimed in claim 1, wherein the at least one data source includes one or more sensors located at the vehicle and further includes one or more communication interfaces for acquiring data from a source remotely located from the vehicle.

8. The method as claimed in claim 7, wherein the one or more communication interfaces for acquiring data from a source remotely located from the vehicle include a GPS receiver, a telecommunications interface, or the GPS receiver and the telecommunications interface.

* * * * *